United States Patent [19]

Lienhard et al.

[11] 4,370,431
[45] Jan. 25, 1983

[54] PROCESS FOR COLORING FIBRE FORMING POLYAMIDES IN THE MELT WITH AZO PIGMENTS

[75] Inventors: Paul Lienhard, Frenkendorf; Armand Rouèche, Bottmingen, both of Switzerland

[73] Assignee: Ciba-Geigy Corporation, Ardsley, N.Y.

[21] Appl. No.: 291,546

[22] Filed: Aug. 10, 1981

[30] Foreign Application Priority Data

Aug. 20, 1980 [CH] Switzerland .................. 6285/80

[51] Int. Cl.³ .............................................. C08L 77/00
[52] U.S. Cl. .................................. 524/100; 524/606
[58] Field of Search .................. 260/37 NP, 37 P; 524/606, 100

[56] References Cited

U.S. PATENT DOCUMENTS

| | | | |
|---|---|---|---|
| 3,573,272 | 3/1971 | Kaupp et al. | 260/37 NP |
| 3,598,801 | 8/1971 | Beffa et al. | 260/37 N |
| 3,974,123 | 8/1976 | Dehnert et al. | 260/40 P |
| 4,340,430 | 7/1982 | Roueche | 524/100 |

FOREIGN PATENT DOCUMENTS 107065 7/1974 German Democratic Rep. .

OTHER PUBLICATIONS

CA, 82, 87169b (1975).

Primary Examiner—Lewis T. Jacobs
Attorney, Agent, or Firm—Luther A. R. Hall

[57] ABSTRACT

The invention relates to a process for coloring polyamides in the melt with azo pigments of the formula

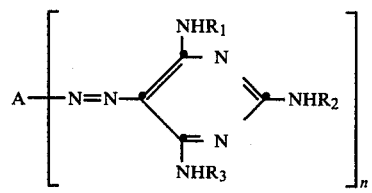

wherein A is the radical of a diazo or tetraazo component, $R_1$, $R_2$ and $R_3$ are hydrogen atoms or alkyl, cyclo alkyl, phenylalkyl or aryl radicals, and n is 1 or 2.

Articles colored with the pigments have level, strong yellow shades of excellent fastness to light, wet processing, rubbing and thermofixation.

9 Claims, No Drawings

PROCESS FOR COLORING FIBRE FORMING POLYAMIDES IN THE MELT WITH AZO PIGMENTS

The present invention relates to a process for colouring fibre forming polyamides in the melt with azo pigments of the formula

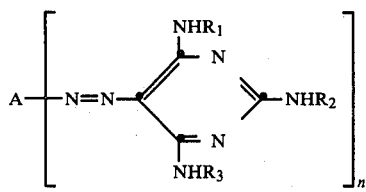

wherein A is the radical of a diazo or tetraazo component, $R_1$, $R_2$ and $R_3$ are hydrogen atoms, alkyl, cycloalkyl, phenalkyl or aryl radicals, and n is 1 or 2.

The radical A can be derived from any diazo components, for example of the benzene or naphthalene series. These can contain the customary substituents of azo pigments, in particular sulfo or carboxyl groups, and halogen atoms such as fluorine, chlorine or bromine; carbamoyl, sulfamoyl or cyano groups; alkyl, alkoxy or alkylmercapto groups containing 1 to 6 carbon atoms; phenoxy or phenylmercapto groups which are unsubstituted or substituted by halogen atoms or methyl or methoxy groups; naphthoxy groups, phenalkyl groups or acyl groups such as alkanoyl groups containing 2 to 6 carbon atoms; acylamino groups such as alkanoylamino groups containing 2 to 6 carbon atoms, e.g. acetylamino, chloroacetylamino, propionylamino or benzoylamino groups; alkylsulfamoyl groups containing 1 to 6 carbon atoms, alkylcarbamoyl groups containing 2 to 6 carbon atoms; phenylsulfonyl, phenylsulfamoyl or phenylcarbamoyl groups which are unsubstituted or substituted by chlorine atoms or methyl or methoxy groups; and phenylazo groups.

Suitable radicals of heterocyclic diazo components are, in particular, 5- or 6-membered nitrogen-containing heterocyclic rings of aromatic character, e.g. of the pyrrole, pyrazole, thiazole, oxdiazole, thiodiazole, triazole, tetrazole or pyridine series. Polynuclear condensed heterocyclic rings are also suitable, which rings preferably contain a fused benzene ring. Examples are the unsubstituted or substituted benzthiazole, benztriazole, indole, indazole, quinoline, phthalimide and phthalic anhydride rings. These mono- or polynuclear heterocyclic diazo radicals can also contain the customary substituents of azo pigments of the kind specified above.

A phthalimide radical A is preferably a radical of the formula

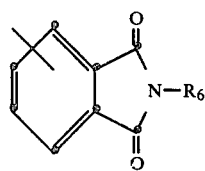

wherein $R_6$ is a hydrogen atom, a $C_1$-$C_4$alkyl group or a phenyl radical which is unsubstituted or substituted by chlorine atoms or methyl or methoxy groups.

The radical A can also be the radical of a tetraazo component, i.e. it can be derived from a diamine, from a diaminodiphenyl or from a diaminodiphenyl derivative, the benzene rings of which are linked through a bridge member. Bridge members can be bivalent atoms such as O or S, or bivalent groups, e.g. an amino group which is unsubstituted or substituted by $C_1$-$C_6$alkyl groups, or straight-chain or branched alkylene radicals preferably containing 1 to 6 carbon atoms, e.g. the methylene, 1,2-alkylene or 2,2-propylene group, cycloalkyl groups such as the 1,1-cyclohexyl group, and the radicals —CO—, —SO— or —SO$_2$—, —CH=CH—, —N=N—, —SO$_2$O—, —SO$_2$—NR—, —SO$_2$N-HSO$_2$—, —RNCO— or —RN—CO—NR—, wherein R is a hydrogen atom or a $C_1$-$C_6$alkyl group.

$R_1$, $R_2$ and $R_3$ as alkyl radicals in formula (1) are preferably alkyl radicals of 1 to 6 carbon atoms which can be substituted, e.g. by hydroxyl groups, $C_1$-$C_4$alkoxy groups, cyano or phenyl groups. Examples of cycloalkyl radicals are cyclohexyl radicals. $R_1$, $R_2$ or $R_3$ as aryl radicals are preferably phenyl radicals which can contain chlorine atoms, methyl, ethoxy or sulfo groups.

The pigments of the formula (1) preferably contain 1 or 2 carboxyl or sulfo groups in the molecule.

Particularly interesting pigments are those of the formula (1), wherein A is a phenyl or naphthyl radical, in particular one of the formula

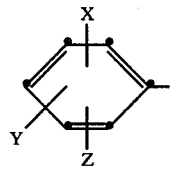

wherein X is a hydrogen or halogen atom, an alkyl or alkoxy group, each of 1 to 6 carbon atoms, an alkoxycarbonyl group of 2 to 6 carbon atoms, a nitro, cyano or trifluoro methyl group, a sulfo or carboxyl group, or an alkanoylamino group of 2 to 6 carbon atoms, a phenoxy, phenylcarbamoyl, phenoxycarbonyl, phenylsulfonyl or phenoxysulfonyl group, each of which can be substituted by chlorine atoms or methyl or methoxy groups, or a group of the formula

—SO$_2$NR$_4$R$_5$ wherein $R_4$ is a hydrogen atom, an alkyl group of 1 to 6 carbon atoms, a phenyl group which is unsubstituted or substituted by chlorine atoms or methyl groups, $R_5$ is a hydrogen atom or an alkyl group of 1 to 6 carbon atoms, Y is a hydrogen or halogen atom, or a methyl, carboxyl or sulfo group, and Z is a hydrogen or halogen atom or a methyl group.

Preferred pigments are those of the formula

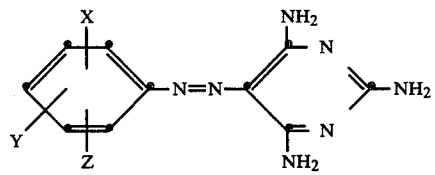

wherein X, Y and Z are as defined above.

Further preferred pigments are those of the formula

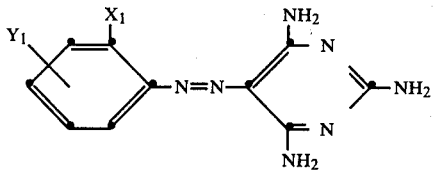

wherein $X_1$ is a carboxyl or sulfo group, $Y_1$ is a hydrogen atom or a methyl or carboxyl group, and also the novel pigments of the formula

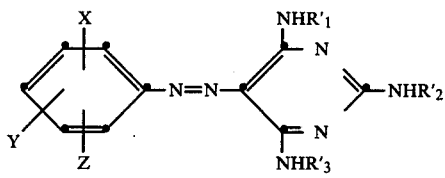

wherein X, Y and Z are as defined above, one of $R_1'$, $R_2'$ and $R_3'$ is a sulfophenyl group which is unsubstituted or substituted by chlorine atoms or methyl or methoxy groups, and the others are hydrogen atoms, alkyl groups of 1 to 6 carbon atoms or phenyl groups which are unsubstituted or substituted by chlorine atoms or methyl or methoxy groups.

Particularly interesting pigments of the disazo series are those of the formula

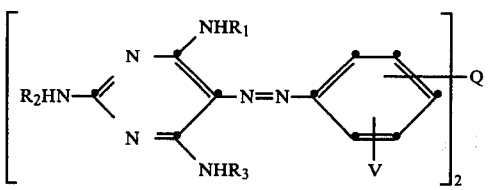

wherein $R_1$, $R_2$ and $R_3$ are as defined above, Q is a direct bond or a bridge member, V is a hydrogen or chlorine atom or a methyl or methoxy group.

Some of the pigments of this invention are known [German Offenlegungsschrift No. 1 719 080 and Chem. Pharma Bull. 7, pp. 1–6 (1959)] and can be obtained by the methods described therein by coupling a diazotised monoamine or a tetraazotised diamine with one or two moles of a triaminopyrimidine of the formula

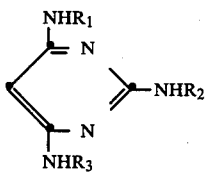

by conventional methods, in acid, neutral or alkaline medium, optionally in the presence of a water-soluble solvent such as ethanol or dioxane.

If 1-aminobenzene-2-sulfonamides or -carboxamides are used as diazo components, then the diazotisation results in the formation of benztriazinones, which have to be cleaved with alkalies before the coupling in alkaline medium.

Representative examples of diazo components are:
1-amino-2-, -3- or -4-chlorobenzene
1-amino-2,3-, -2,4-, -3,4- or -2,5-dichlorobenzene
1-amino-3-chloro-4-methylbenzene
1-amino-2- or -4-methylbenzene
1-amino-2- or -4-methoxybenzene
1-aminobenzene-2,3- or -4-sulfonic acid
1-aminobenzene-2,5-disulfonic acid
1-amino-2-chlorobenzene-4-sulfonic acid
1-amino-4-chlorobenzene-3-sulfonic acid
1-amino-2,5-dichlorobenzene-4-sulfonic acid
1-aminobenzene-2-, -3- or -4-sulfophenyl ester
1-aminobenzene-2-, -3- or -4-sulfonamide
1-aminobenzene-2-, -3- or -4-sulfomethylamide
1-aminobenzene-2-, -3- or -4-sulfoethylamide
1-aminobenzene-2-, -3- or -4-sulfophenylamide
1-aminobenzene-2-, -3- or -4-carboxylic acid
1-aminobenzene-2,3- -2,4- or -3,4-dicarboxylic acid
1-amino-2-chloro-5-benzoic acid
1-aminobenzene-2-, -3- or -4-carboxylic acid methyl ester
1-aminobenzene-2-, -3- or -4-carboxylic acid ethyl ester
1-aminobenzene-2-, -3- or -4-carboxylic acid phenyl ester
1-aminobenzene-2-, -3- or -4-carboxamide
1-aminobenzene-2-, -3- or -4-carboxylic acid ethylamide
1-aminobenzene-2-, -3- or -4-carboxanilide
1-aminobenzene-2-, -3- or -4-carboxylic acid N-ethylanilide
1-aminobenzene-2-, -3- or -4-methylsulfonylbenzene
4-aminoazobenzene
4-aminoazobenzene-2'-, -3'- or -4'-sulfonic acid
4-amino-3'-chloroazobenzene
4-amino-2-methylazobenzene
4-amino-4'-methylazobenzene
4-amino-2-methoxyazobenzene
2-amino-diphenyl ether
2-amino-4,4'-dichloro-2'-sulfo-diphenyl ether
2-aminobenzophenone
4-amino-4'-methylbenzophenone
2-amino-4'-methyl-diphenylsulfone
3-amino-4-chloro-diphenylsulfone
2-amino-3'-sulfo-diphenylsulfone
1-aminobenzene-naphthalene-4-sulfonic acid
2-aminobenzene-naphthalene-4-sulfonic acid
2-aminobenzene-naphthalene-3,6-disulfonic acid
4-aminophthalic anhydride
3-aminophthalic anhydride
3- or 4-aminophthalimide
3-amino-phthalo-2'-methyl-5'-chlorophenylimide
3-amino-phthalo-2'-methoxy-5'-chlorophenylimide.

Representative examples of tetraazo components are:
3,3'-dichlorobenzidine
3,3'-dimethylbenzidine
3,3'-dimethoxybenzidine
4,4'-diaminostilbene
2,2'-, 3,3'- and 4,4'-diaminodiphenylsulfone
3,3'-diaminobenzophenone
4,4'-diaminodiphenyl oxide
4,4'-diaminodiphenylsulfide
4,4'-diaminodiphenylmethane
2,2-bis-(4'-aminophenyl)propane
4,4'-diaminodiphenylamine
4,4'-diaminodiphenylurea
4,4'-diaminobenzanilide
4,4'-diaminoazobenzene.

The coupling components are known compounds. They are obtained by known methods, e.g. by reacting trichloropyrimidine with ammonia or the corresponding amines, for example methylamine, ethylamine, propylamine, isopropylamine, N-butylamine, n-hexylamine, n-octylamine, cyclohexylamine, aniline, 2-, -3- or -4-chloroaniline, 2-, -3- or -4-methylaniline or anilino-2-, -3- or -4-sulfonic acid. The three chlorine atoms of the trichloropyrimidine can be replaced either by identical or different amines of the kind specified above.

Suitable fibre forming polyamides for the process of this invention are the linear polyamides which can be obtained e.g. from ε-caprolactam ("Perlon", nylon 6), ω-aminoundecanoic acid ("Rilsan"), hexamethylenediamine and adipic acid (nylon 66) or from analogous starting materials. Further suitable polyamides are copolyamides e.g. obtained from ε-caprolactam and hexamethylenediamine and adipic acid.

The pigments are blended with the polyamide by known methods in solid or liquid form or as a solution, and the resultant mix is subjected to an intermediate drying, if desired.

It is preferred to dust the polyamides to be coloured in the form of powders, granules or chips with the dry pigment powder, i.e. to blend them mechanically such that the surface of these particles is coated with a layer of pigment. The pigment is conveniently in finely divided form.

Instead of using the pure pigments, it can sometimes be advantageous to use preparations which contain a carrier in addition to the pigment, preferably a calcium or magnesium salt of a higher fatty acid, for example of stearic or behenic acid.

The polyamide particles containing the pigment or pigment preparation are fused and the melt is then spun by known methods or otherwise shaped to sheets or other moulded articles, e.g. to injection moulded articles.

The pigment or pigment preparation can also be incorporated in solid or liquid form in the fused polyamide, which is then spun or shaped.

The articles obtained are uniformly coloured and have excellent fastness to light, wet processing, rubbing and thermofixation.

The pigments are uniformly and finely dispersed in the coloured material. Although their solubility in organic solvents such as chlorinated hydrocarbons, lower ketones, esters and alcohols is not high, they are often present in the polyamide in dissolved form.

The coloured articles conveniently contain 0.01 to 3% of colorant.

It is surprising that the azo pigments to be used in the practice of this invention withstand the high temperatures and the reducing conditions of the melt process without substantial decomposition and that the textile properties of the fibres are not greatly impaired.

Compared with the arylazopyrazolonesulfonic acids known from GDR patent specification No. 107 065, the azo compounds containing sulfo groups of this invention have a better thermostability and can therefore be used in a substantially broader temperature range and over longer spinning times.

Azo compounds of the present invention which contain carboxyl groups are superior in rub fastness (bleeding) to the azopyridine compounds which do not contain acid groups described in German Offenlegungsschrift No. 2 409 754.

The invention is illustrated by the following Examples, in which parts and percentages are by weight, unless otherwise indicated.

EXAMPLE 1

5 g of the azo pigment of formula (1) or of an isomer of the formula

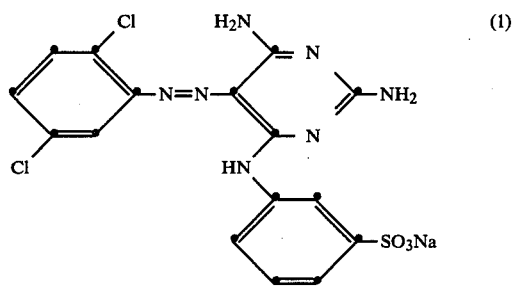

are dissolved in 1000 ml of warm water, then 500 g of polycaprolactam granules are added and the solution is heated, with constant stirring or agitating, to the boil. After ½ hour to 1 hour 5 ml of acetic acid or 5-10 g of ammonium acetate are added and boiling is continued until the bulk of the pigment is exhausted onto the polyamide. The granules are then collected by filtration, washed thoroughly with water and dried. Melt spinning yields a fibre material coloured in a strong, level yellow shade of very good fastness to water, washing, shampooing, solvents, rubbing, thermofixation, peroxide bleaching and light.

EXAMPLE 2

99 g of polyamide obtained from ε-caprolactam (polyamide 6) in the form of chips are dusted dry with 1 g of the azo pigment of the formula

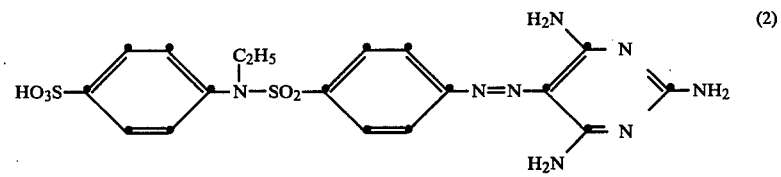

The treated chips are spun at 270°-280° C. in an extruder, to give a fibre material coloured in a level yellow shade of excellent fastness to light, wet processing and thermofixation.

EXAMPLE 3

60 g of the azo pigment of the formula

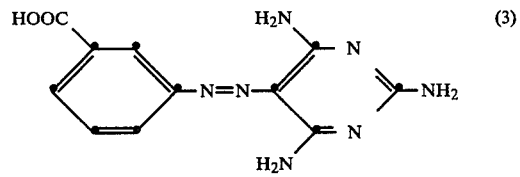

and 60 g of magnesium stearate are processed at 150°-160° C. in a laboratory kneader. After a homogeneous mixture has been obtained, the cooled, brittle product is ground, to give a preparation containing 50% of colorant.

98 g of polyamide 6 in granular form are dusted dry with 2 g of the colorant preparation. The treated granules are spun at 270°–280° C. in an extruder, to give a fibre material coloured in a strong yellow shade of very good performance properties.

EXAMPLES 4–56

Fibres which are also coloured in very fast, level yellow to orange shades are obtained by the melt coloration of polyamide 6 in accordance with Examples 1 to 3, using one of the monoazo pigments listed in Table 1 or one of the disazo pigments listed in Table 2.

TABLE 1

| Example | Monoazo pigments from diazo component | coupling component | Shade on PA 6 |
|---|---|---|---|
| 4 | 1-aminobenzene-2-sulfonic acid | 2,4,6-triaminopyrimidine | greenish yellow |
| 5 | 1-aminobenzene-4-sulfonic acid | 2,4,6-triaminopyrimidine | greenish yellow |
| 6 | 1-amino-4-chlorobenzene-2-sulfonic acid | 2,4,6-triaminopyrimidine | yellow |
| 7 | 1-amino-2-chlorobenzene-5-sulfonic acid | 2,4,6-triaminopyrimidine | greenish yellow |
| 8 | 1-amino-2-chlorobenzene-4-sulfonic acid | 2,4,6-triaminopyrimidine | greenish yellow |
| 9 | 1-amino-3-chloro-6-methylbenzene-4-sulfonic acid | 2,4,6-triaminopyrimidine | yellow |
| 10 | 1-amino-2,5-dichlorobenzene-4-sulfonic acid | 2,4,6-triaminopyrimidine | yellow |
| 11 | 1-amino-benzene-2,4-disulfonic acid | 2,4,6-triaminopyrimidine | yellow |
| 12 | 3-aminophthalic acid | 2,4,6-triaminopyrimidine | reddish yellow |
| 13 | 4-aminophthalic acid | 2,4,6-triaminopyrimidine | reddish yellow |
| 14 | 1-amino-4-sulfobenzene-2-carboxylic acid | 2,4,6-triaminopyrimidine | yellow |
| 15 | 2-amino-3′-sulfodiphenylsulfone | 2,4,6-triaminopyrimidine | yellow |
| 16 | 1-aminobenzene-2-sulfonic acid-N—ethyl-N—4′-sulfophenylamide | 2,4,6-triaminopyrimidine | yellow |
| 17 | 1-amino-2,5-dichlorobenzene-4-sulfonic acid | 2,4,6-triethylaminopyrimidine | reddish yellow |
| 18 | 1-amino-2,5-dichlorobenzene-4-sulfonic acid | 2,4,6-tri-n-butylaminopyrimidine | reddish yellow |
| 19 | 1-amino-2,5-dichlorobenzene-4-sulfonic acid | 2,4,6-tri-phenylaminopyrimidine | orange |
| 20 | 1-aminobenzene-2-sulfonic acid N—ethyl-N—4′-sulfophenylamide | 2,4,6-triethylaminopyrimidine | yellow |
| 21 | 1-aminobenzene-2-sulfonic acid N—ethyl-N 4′-sulfophenylamide | 2,4,6-tri-β-hydroxyethylaminopyrimidine | yellow |
| 22 | 2,3-dichloroanilide | mixture of 2,4-diamino-6-(3′-sulfophenylamino)-pyrimidine and 2,6-diamino-4-(3′-sulfophenylamino)-pyrimidine | |
| 23 | 3,4-dichloroaniline | mixture of 2,4-diamino-6-(3′-sulfophenylamino)-pyrimidine and 2,6-diamino-4-(3′-sulfophenylamino)-pyrimidine | yellow |
| 24 | 3-trifluoromethylaniline | mixture of 2,4-diamino-6-(3′-sulfophenylamino)-pyrimidine and 2,6-diamino-4-(3′-sulfophenylamino)-pyrimidine | greenish yellow |
| 25 | 3-sulfomoylaniline | mixture of 2,4-diamino-5-(3′-sulfophenylamino)-pyrimidine and 2,6-diamino-4-(3′-sulfophenylamino)-pyrimidine | greenish yellow |
| 26 | 2-cyanoaniline | mixture of 2,4-diamino-5-(3′-sulfophenylamino)-pyrimidine and 2,6-diamino-4-(3′-sulfophenylamino)-pyrimidine | yellow |
| 27 | 4-chloroaniline | mixture of 2,4-dicyclohexylamino-6-(3′-sulfophenylamino)-pyrimidine and 2,6-dicyclohexylamino-4-(3′-sulfophenylamino)-pyrimidine | yellow |
| 28 | 4-chloraniline | 2-cyclohexylamino-4,6-di-(3′-sulfophenylamino)pyrimidine | reddish yellow |
| 29 | 1-amino-4-chlorobenzene-4-sulfonic acid | mixture of 2,4-diethylamino-6(4′-chlorophenylamino)-pyrimidine and the 2,6,4-isomer | reddish yellow |
| 30 | 2,5-dichloroaniline | mixture of 2,4-diamino-6-(3′-methyl-4′-sulfophenylamino)-pyrimidine and the 2,6,4-isomer | yellow |
| 31 | 2,5-dichloroaniline | mixture of 2,4-diamino-6-(2′-methoxy-5′-sulfophenylamino)-pyrimidine and the 2,6,4-isomer | yellow |
| 32 | 3-amino-4-methylbenzoic acid | 2,4,6-triaminopyrimidine | greenish yellow |
| 33 | 3-aminobenzoic acid | 2,4,6-triaminopyrimidine | yellow |
| 34 | 1-amino-3-chloro-4-methyl-6-benzenesulfonic acid | 2,4,6-triaminopyrimidine | yellow |
| 35 | 1-amino-4-methyl-6-benzenesulfonic acid | 2,4,6-triaminopyrimidine | greenish yellow |
| 36 | 1-aminobenzene-2,5-disulfonic acid | 2,4,6-triaminopyrimidine | greenish yellow |
| 37 | 3-aminophthalic anhydride | 2,4,6-triaminopyrimidine | yellow |
| 38 | 4-aminophthalic acid 2′-methoxy-5′-chlorophenylimide | 2,4,6-triaminopyrimidine | reddish yellow |
| 39 | 4-aminophthalic acid 4′-chlorophenylimide | 2,4,6-triaminopyrimidine | reddish yellow |
| 40 | 3-aminophthalic acid 2′-methyl-5′-chlorophenylimide | 2,4,6-triaminopyrimidine | yellow |
| 41 | 5-aminoisophthalic acid | 2,4,6-triaminopyrimidine | greenish yellow |
| 42 | 3-aminophthalic acid | 2,4,6-triphenylamino-pyrimidine | orange |
| 43 | aminoterephthalic acid | 2,4,6-triaminopyrimidine | greenish yellow |
| 44 | 3-aminophthalic acid | 2,4,6-triisopropylaminopyrimidine | yellow |
| 45 | 4-aminophthalophenylimide | 2,4,6-triaminopyrimidine | reddish yellow |
| 46 | 1-amino-3-methyl-4-chloro-6-benzenesulfonic acid | 2,4,6-triaminopyrimidine | greenish |

TABLE 1-continued

| Example | Monoazo pigments from diazo component | coupling component | Shade on PA 6 |
|---|---|---|---|
| 47 | 2-amino-4-sulfonic acid-benzoic acid | 2,4,6-triaminopyrimidine | greenish yellow |
| 48 | 1-amino-3-chloro-4-methyl-6-benzenesulfonic acid | 2,4,6-tribenzyl-amino-pyrimidine | greenish yellow |
| 49 | 3-aminophthalic acid | 2,4,6-trimethyl-amino-pyrimidine | reddish yellow |

TABLE 2

| Example | Disazo pigment from tetraazo component | coupling component | Shade on PA 6 |
|---|---|---|---|
| 50 | 4,4'-diaminodiphenyl-sulfone | mixture of 2,4-diamino-6-(3'-sulfophenylamino)-pyrimidine and the 2,6,4-isomer | reddish yellow |
| 51 | 3,3'-diaminodiphenyl-sulfone | mixture of 2,4-diamino-6-(3'-sulfophenylamino)-pyrimidine and the 2,6,4-isomer | greenish yellow |
| 52 | 2,2'-diamino-4,4'-dichloro-diphenylsulfide | mixture of 2,4-diamino-6-(3'-sulfophenylamino)-pyrimidine and the 2,6,4-isomer | yellow |
| 53 | 4,4'-diaminodiphenyl-methane | mixture of 2,4-diamino-6-(3'-sulfophenylamino)-pyrimidine and the 2,6,4-isomer | yellow |
| 54 | 4,4'-diamino-2,2'-dimethyldiphenyl | mixture of 2,4-diamino-6-(3'-sulfophenylamino)-pyrimidine and the 2,6,4-isomer | yellow |
| 55 | 4,4'-diaminodiphenyl-sulfone | mixture of 2,4-diethylamino-6-(3'-sulfophenylamino)pyrimidine and the 2,6,4-isomer | golden yellow |
| 56 | 2-amino-4-(4'-aminophenylsulfonylamino)-benzenesulfonic acid | 2,4,6-triaminopyrimidine | yellow |

EXAMPLE 57

The pigment of Example 12 is obtained as follows:

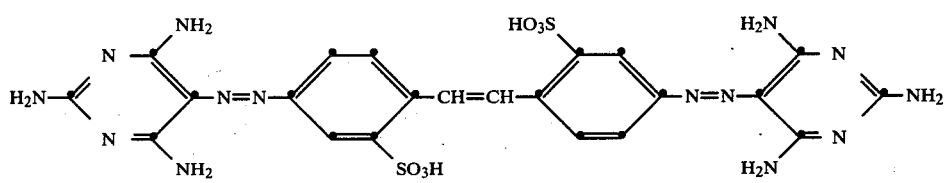

parts of the disodium salt of 3-aminophthalic acid (0.2 1 mole) are dissolved in 200 parts of water, and then 90 parts by volume of 30% hydrochloric acid are added. Diazotisation is subsequently carried out at 0°–3° C. with 50 parts by volume of 4 N NaNO₂ solution, whereupon the diazonium salt precipitates after briefly going into solution.

25 parts (0.2 mole) of 2,4,6-triaminopyridine are first dissolved in 300 parts of water at 55° C. and then precipitated at room temperature. The above suspension of the diazonium salt is then added to the suspension of the coupling component over about 90 minutes at 15°–20° C. and pH 8–9 with the gradual addition of about 57 parts by volume of 30% aqueous sodium hydroxide. The coupling is complete after 2 hours. Then 72 parts of 30% hydrochloric acid are added and the suspension is adjusted to pH 1 and further stirred for 30 minutes at 80° C. The precipitated product is isolated by filtration in conventional manner and washed with water until neutral. The filter cake is then dried in vacuo at 80° C., affording 64 parts (95.5% of theory) of a yellow pigment powder of the formula

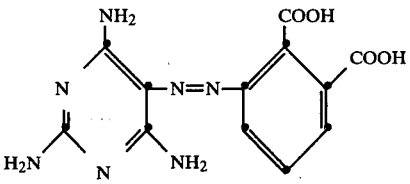

which contains 1 mole of water of crystallisation.

Combustion analysis: Theory (with 1 mole of H₂O) $C_{12}H_{11}N_7O_4 \cdot H_2O$ (mol. wt.: 335)—C %, 42.4; H %, 3.88; N %, 29.2. Found: C %, 42.5; H %, 3.7; N % 28.5.

EXAMPLE 58

Using the same amount of the disodium salt of 4-aminophthalic acid instead of the 3-aminophthalic acid derivative yields 63 parts of a yellow pigment of the formula

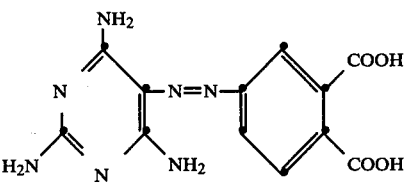

which also contains 1 mole of water of crystallisation. $C_{12}H_{11}N_7O_\beta \cdot H_2O$ (mol. wt.: 335)— Found: C %, 43.5; H %, 3.9; N %, 29.9. Theory: C %, 42.9; H %, 3.88; N %, 29.2%.

EXAMPLE 59

99 g of polyamide graunules obtained from ε-caprolactam (polyamide 6) are dusted dry with 1 g of the azo pigment of the formula The treated chips are spun at 270°–280° C. in an extruder, to give a fibre material coloured in a level yellow orange shade of excellent fastness to washing, shampooing, solvents, dry heat and rubbing.

EXAMPLE 60

Fibres coloured in very fast level shades are likewise obtained by the melt coloration of polyamide 6 as described in Examples 1 to 3 and 59, using an azo pigment listed in Table 3.

TABLE 3

| Example | Azo pigment obtained from diazo component | coupling component | Shade on PA 6 |
|---|---|---|---|
| 61 | 3-aminoindazole | mixture of 2,4-diamino-6-(3'-sulfophenylamino)-pyrimidine and the 2,6,4-isomer | yellow |
| 62 | 6-aminoindazole | mixture of 2,4-diamino-6-(3'-sulfophenylamino)-pyrimidine and the 2,6,4-isomer | yellow |
| 63 | 3,3'-dichloro-benzidine | mixture of 2,4-diamino-6-(3'-sulfophenylamino)-pyrimidine and the 2,6,4-isomer, 2-equivalents | red |

What is claimed is:

1. A process for colouring fibre forming polyamides in the melt, which process comprises the use of an azo pigment of the formula

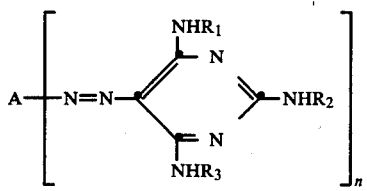

wherein A is the radical of a diazo or tetraazo component, $R_1$, $R_2$ and $R_3$ are hydrogen atoms or alkyl, cycloalkyl, phenylalkyl or aryl radicals, and n is 1 or 2.

2. A process according to claim 1, which comprises the use of a monoazo pigment, wherein A is a phenyl or naphthyl radical.

3. A process according to either of claims 1 or 2, which comprises the use of a pigment which contains 1 or 2 sulfo and/or carboxyl groups in the molecule.

4. A process according to claim 1, which comprises the use of a monoazo pigment, wherein A is a radical of the formula

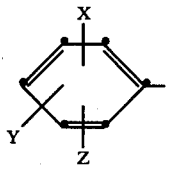

wherein X is a hydrogen atom, an alkyl or alkoxy group, each of 1 to 6 carbon atoms, an alkoxycarbonyl group of 2 to 6 carbon atoms, a cyano or trifluoromethyl group, a sulfo or carboxyl group, or an alkanoylamino group of 2 to 6 carbon atoms, a phenoxy, phenylcarbamoyl, phenylsulfonyl, phenoxycarbonyl or phenoxysulfonyl group, each of which group is unsubstituted or substituted by chlorine atoms or methyl or methoxy groups, or a group of the formula

wherein $R_4$ is a hydrogen atom, an alkyl group of 1 to 6 carbon atoms, a phenyl group which is unsubstituted or substituted by chlorine atoms or methyl groups, $R_5$ is a hydrogen atom or an alkyl group of 1 to 6 carbon atoms, Y is a hydrogen or halogen atom, or a methyl, carboxyl or sulfo group, and Z is a hydrogen or halogen atom or a methyl group.

5. A process according to claim 1, which comprises the use of a pigment of the formula

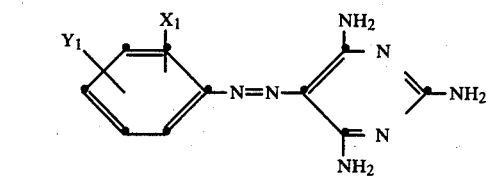

wherein $X_1$ is a carboxyl or sulfo group, $Y_1$ is a hydrogen atom or a methyl or carboxyl group.

6. A process according to claim 1 which comprises the use of a pigment of the formula

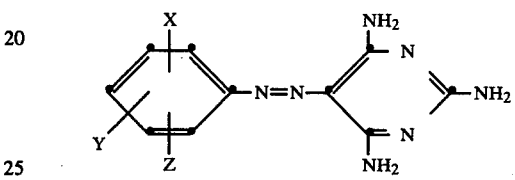

wherein X is a hydrogen atom, an alkyl or alkoxy group, each of 1 to 6 carbon atoms, an alkoxycarbonyl group of 2 to 6 carbon atoms, a cyano or trifluoromethyl group, a sulfo or carboxyl group, or an alkanoylamino group of 2 to 6 carbon atoms, a phenoxy, phenylcarbamoyl, phenylsulfonyl, phenoxycarbonyl or phenoxysulfonyl group, each of which group is unsubstituted or substituted by chlorine atoms or methyl or methoxy groups, or a group of the formula

wherein $R_4$ is a hydrogen atom, an alkyl group of 1 to 6 carbon atoms, a phenyl group which is unsubstituted or substituted by chlorine atoms or methyl groups, $R_5$ is a hydrogen atom or an alkyl group of 1 to 6 carbon atoms, Y is a hydrogen or halogen atom, or a methyl, carboxyl or sulfo group, and Z is a hydrogen or halogen atom or a methyl group.

7. A process according to claim 1 which comprises the use of a pigment of the formula

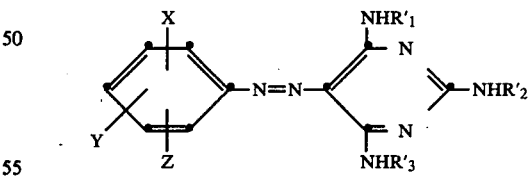

wherein X is a hydrogen atom, an alkyl or alkoxy group, each of 1 to 6 carbon atoms, an alkoxycarbonyl group of 2 to 6 carbon atoms, a cyano or trifluoromethyl group, a sulfo or carboxyl group, or an alkanoylamino group of 2 to 6 carbon atoms, a phenoxy, phenylcarbamoyl, phenylsulfonyl, phenoxycarbonyl or phenoxysulfonyl group, each of which group is unsubstituted or substituted by chlorine atoms or methyl or methoxy groups, or a group of the formula

wherein $R_4$ is a hydrogen atom, an alkyl group of 1 to 6 carbon atoms, a phenyl group which is unsubstituted or substituted by chlorine atoms or methyl groups, $R_5$ is a hydrogen atom or an alkyl group of 1 to 6 carbon atoms, Y is a hydrogen or halogen atom, or a methyl, carboxyl or sulfo group, Z is a hydrogen or halogen atom or a methyl group, one of $R_1'$, $R_2'$ and $R_3'$ is a sulfophenyl group which is unsubstituted or substituted by chlorine atoms or methyl or methoxy groups, and the others are hydrogen atoms, $C_1$-$C_6$alkyl groups, or phenyl groups which are unsubstituted or substituted by chlorine atoms or methyl or methoxy groups.

8. A process according to claim 1, which comprises the use of a pigment of the formula

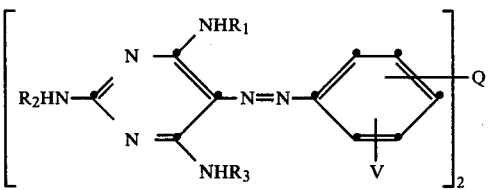

wherein $R_1$, $R_2$ and $R_3$ are hydrogen atoms or alkyl, cycloalkyl, phenylalkyl or aryl radicals, Q is a direct bond or a bridge member, and V is a hydrogen or chlorine atom or a methyl or methoxy group.

9. A fiber-forming polyamide containing an azo pigment of the formula

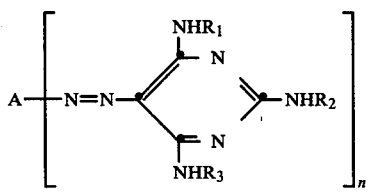

wherein A is the radical of a diazo or tetraazo component, $R_1$, $R_2$ and $R_3$ are hydrogen atoms or alkyl, cycloalkyl, phenylalkyl or aryl radicals, and n is 1 or 2.

* * * * *